J. IBBOTSON.
ROSIN APPLICATOR.
APPLICATION FILED FEB. 20, 1909.

936,133.

Patented Oct. 5, 1909.

Witnesses:
Jos. P. Wahler
P. M. Smith

Inventor:
John Ibbotson,
By Victor J. Evans,
Attorney.

UNITED STATES PATENT OFFICE.

JOHN IBBOTSON, OF BROOKLYN, NEW YORK.

ROSIN-APPLICATOR.

936,133.  Specification of Letters Patent.  Patented Oct. 5, 1909.

Application filed February 20, 1909. Serial No. 479,035.

*To all whom it may concern:*

Be it known that I, JOHN IBBOTSON, a citizen of the United States, residing at Brooklyn, in the county of Kings and State of New York, have invented new and useful Improvements in Rosin-Applicators, of which the following is a specification.

This invention relates to rosin applicators, the object of the invention being to provide a rosin holder of such construction as to enable the rosin to be applied to the bows of stringed instruments without necessitating the operator's fingers coming in contact with the rosin, the construction of the holder being such that it may be entirely closed so as to completely incase and conceal and protect the rosin contained therein.

With the above and other objects in view the invention consists in the novel construction, combination and arrangement herein fully described, illustrated and claimed.

Figure 1:
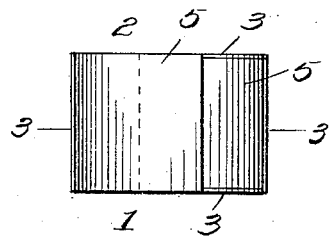
Figure 2:
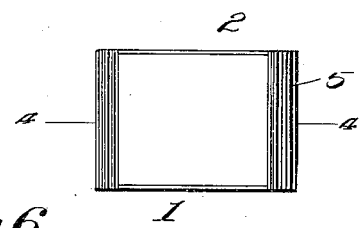
Figure 6:
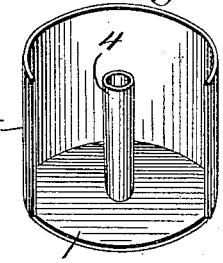
Figure 3:
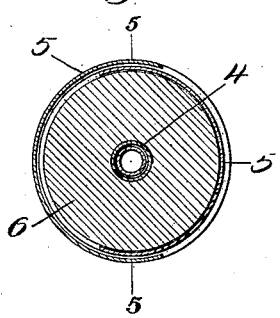
Figure 4:
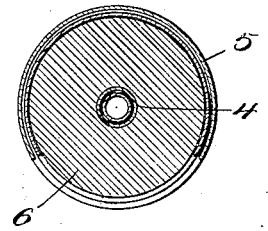
Figure 5:
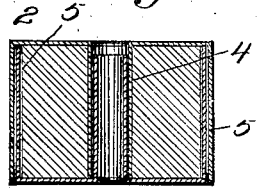

In the accompanying drawings: Figure 1 is a side elevation of the device closed. Fig. 2 is a similar view of the device open. Fig. 3 is a horizontal section on the line 3—3 of Fig. 1. Fig. 4 is a similar section on the line 4—4 of Fig. 2. Fig. 5 is a vertical diametrical section on the line 5—5 of Fig. 3. Fig. 6 is a perspective view of one of the sections of the holder.

The applicator, which is in the form of a box of cylindrical shape, comprises two sections corresponding with each other with the exception that one of the sections is of slightly different dimensions so that it may be partially inclosed by the other section. These sections indicated at 1 and 2 are combined with each other in the manner illustrated, each section embodying a disk-shaped end 3, a central stem 4 and a substantially semi-cylindrical side wall 5. Each of the sections is formed as shown in Fig. 6 wherein it will be observed that the centrally arranged stem 4 is of slightly less height than the side wall 5, thereby enabling the two sections when reversely disposed, to be telescoped one within the other as shown in Fig. 5. It will also be noted that the central stem 4 of one section of the device is adapted to fit snugly within the tubular stem 4 of the other member thereby permitting the two sections to have a relative rotative movement one around and upon the other, and also adapting the two sections to be drawn apart and separated for the purpose of applying a cake of rosin thereto.

The cake of rosin illustrated at 6 is in the form of a cylinder and is provided with a central hole adapting it to be fitted over the larger of the two central stems 4 and within the semi-cylindrical side wall 5 of the smaller section of the holder.

When the cake of rosin is in place and the two sections are combined as shown in Fig. 5, the cake of rosin is completely incased and protected and concealed as indicated in Fig. 1. It will be understood that the side walls 5 are a little greater than a semi-circle so that their edges will overlap each other when the holder is closed as indicated in Fig. 3. The arrangement however, will not interfere with opening the holder in the manner shown in Fig. 4, wherein it will be observed that the cake of rosin is exposed through the opening in the side walls of the sections, enabling the bow of a stringed instrument to be passed across the surface of the cake of rosin. Furthermore, as the cake becomes worn away at one side, it may be turned to present another surface and in this way practically the entire cake of rosin may be used. There is no need of the fingers of the operator coming in contact with the rosin.

I claim:

A rosin applicator for use on the bows of stringed instruments, consisting of a box of cylindrical shape comprising two interfitting sections having telescopic relatively rotatable stems, disk-shaped ends, and semi-cylindrical side walls, the latter being adapted to slide and turn one within the other, and the box as a whole forming an inclosing case for a cake of rosin.

In testimony whereof I affix my signature in presence of two witnesses.

JOHN IBBOTSON.

Witnesses:
  THEODORE L. KUETT,
  JOHN D. NEPPERT.